United States Patent
Gandhi et al.

(10) Patent No.: US 10,931,563 B2
(45) Date of Patent: Feb. 23, 2021

(54) ADAPTIVE ROUTING PIPELINES FOR VARIABLE ENDPOINT PERFORMANCE

(71) Applicant: Microsoft Technology Licensing, LLC, Redmond, WA (US)

(72) Inventors: Vishal Gandhi, Kirkland, WA (US); Vaibhav Sharma, Seattle, WA (US); Kapil Agarwal, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 56 days.

(21) Appl. No.: 16/361,417

(22) Filed: Mar. 22, 2019

(65) Prior Publication Data

US 2020/0304401 A1 Sep. 24, 2020

(51) Int. Cl.
*H04L 12/721* (2013.01)
*H04L 12/26* (2006.01)
*H04L 12/751* (2013.01)
*H04L 12/727* (2013.01)

(52) U.S. Cl.
CPC .......... *H04L 45/127* (2013.01); *H04L 43/065* (2013.01); *H04L 43/0852* (2013.01); *H04L 45/08* (2013.01); *H04L 45/121* (2013.01); *H04L 45/14* (2013.01); *H04L 45/70* (2013.01)

(58) Field of Classification Search
CPC ... H04L 45/127; H04L 45/14; H04L 43/0852; H04L 43/065; H04L 45/70; H04L 45/08; H04L 45/121; H04L 2012/5651
See application file for complete search history.

(56) References Cited

U.S. PATENT DOCUMENTS

| | | | |
|---|---|---|---|
| 8,028,020 B2 | 9/2011 | Huck et al. | |
| 9,471,585 B1 | 10/2016 | Theimer | |
| 9,639,589 B1 | 5/2017 | Theimer et al. | |
| 9,923,821 B2* | 3/2018 | Nolan ............. | H04L 47/11 |
| 10,097,379 B2 | 10/2018 | Nolan et al. | |
| 2004/0117386 A1 | 6/2004 | Lavender et al. | |

(Continued)

OTHER PUBLICATIONS

Berdy, Nicole, "IoT Hub Message Routing: Now with Routing on Message Body", Retrieved from: <<https://azure.microsoft.com/en-in/blog/iot-hub-message-routing-now-with-routing-on-message-body/ >>, May 31, 2017, 5 Pages.

(Continued)

*Primary Examiner* — Afshawn M Towfighi
(74) *Attorney, Agent, or Firm* — Buckley, Maschoff & Talwalkar LLC

(57) ABSTRACT

A system includes determination of a respective performance level associated with each of a plurality of endpoints assigned to a first routing pipeline, determination of a slow one of the plurality of endpoints based on the respective performance levels, and, in response to the determination of the slow one of the plurality of endpoints, instantiation of a second routing pipeline and assignment of the slow one of the plurality of endpoints to the second routing, wherein the first routing pipeline is to receive messages and to route a first plurality of the messages to the plurality of endpoints other than the slow one of the plurality of endpoints, and wherein the second routing pipeline is to receive the messages and to route a second plurality of the messages to the slow one of the plurality of endpoints.

17 Claims, 10 Drawing Sheets

(56) References Cited

U.S. PATENT DOCUMENTS

| | | | |
|---|---|---|---|
| 2004/0117666 A1 | 6/2004 | Lavender et al. | |
| 2004/0117667 A1 | 6/2004 | Lavender et al. | |
| 2009/0100436 A1 | 4/2009 | Adya et al. | |
| 2014/0136878 A1 | 5/2014 | Narayanan et al. | |
| 2015/0156266 A1 | 6/2015 | Gupta | |
| 2017/0163495 A1 | 6/2017 | Kurian et al. | |
| 2019/0140933 A1* | 5/2019 | Guim Bernat | H04L 43/08 |
| 2020/0322425 A1 | 10/2020 | Sharma et al. | |

OTHER PUBLICATIONS

Burgstahler, Lars et al., "New Modifications of the Exponential Moving Average Algorithm for Bandwidth Estimation", In Proceeding of the 15th ITC Specialist Seminar, Jul. 2002, 10 Pages.

Cheung, Shun Yan et al., "Using Destination Set Grouping to Improve the Performance of Windowcontrolled Multipoint Connections", In Proceedings of the 4th International Conference on Computer Communications and Networks, Sep. 20, 1995, pp. 388-395.

Pavitrakar, Vrushali et al., "Vehicular Messaging in IOT Using Epidemic Routing", In International Journal of Computer Applications Technology and Research,vol. 5, Issue 3, Mar. 2016, pp. 137-140.

"Non Final Office Action Issued in U.S. Appl. No. 16/378,207", dated Aug. 21, 2020, 11 Pages.

"International Search Report and Written Opinion Issued in PCT Application No. PCT/US20/024802", dated Oct. 13, 2020, 14 Pages.

"International Search Report and Written Opinion Issued in PCT Application No. PCT/US20/022516", dated Jun. 9, 2020, 14 Pages.

"Notice of Allowance Issued in U.S. Appl. No. 16/378,207", dated Dec. 16, 2020, 10 Pages.

* cited by examiner

ADAPTIVE ROUTING PIPELINES FOR VARIABLE ENDPOINT PERFORMANCE

BACKGROUND

Conventional message routing services provide routing of messages to specified service-facing endpoints. The routing is based on rules that are evaluated for every message, which may result in some messages being routed to multiple endpoints. Routing may be accompanied by pre-processing to enrich messages by adding extra data from other sources and transforming messages to a difference schema if necessary.

Messages to all endpoints are published at the same rate, so the slowest endpoint determines the overall rate of message publishing and the complete pipeline halts if any one endpoint is unresponsive. The latter scenario may be addressed by ignoring endpoints which have been unresponsive for a specified period of time (e.g., one hour), but such an approach does not address the problems caused by slow-but-functioning endpoints.

One option to improve overall latency is to create a separate pipeline per endpoint. This option would prevent one endpoint from hindering the transmission of messages to another endpoint. However, since each pipeline reads and pre-processes all received messages, each additional pipeline requires duplicative reading and pre-processing resources. Each additional pipeline also requires additional bookkeeping overhead to avoid sending duplicate messages.

Systems are needed to provide improved publish-to-delivery latency for messages delivered to one or more of multiple endpoints. Such systems may reduce the effect of a slow or failed endpoint on the delivery of messages to other endpoints without consuming an unsuitable amount of available computing resources.

DETAILED DESCRIPTION

The following description is provided to enable any person in the art to make and use the described embodiments. Various modifications, however, will be apparent to those in the art.

Some embodiments address the foregoing by dynamically adding and removing routing pipelines based on endpoint performance. Some embodiments create a separate routing pipeline for each of one or more classes of low-performing endpoints and assign endpoints to the various routing pipelines based on monitored endpoint performance. An endpoint may be re-assigned from one pipeline to another if the performance of the endpoint changes. Some embodiments may therefore contain the effect of slow endpoints to one or more routing pipelines while well-performing endpoints are served by a dedicated routing pipeline. A limited and configurable number of overall routing pipelines ensures efficient resource consumption.

Embodiments may employ any suitable system to measure endpoint performance. In some embodiments, the generation of pipelines and assignment of endpoints to pipelines are based on predictions of future endpoint performance, which may in turn be based on current and historical endpoint performance. In one non-exhaustive example, some embodiments measure endpoint performance by tracking an exponential moving average of the time taken to write a message to the endpoint. If writing a message to an endpoint is asynchronous (e.g., through a buffer or any other async mechanism), endpoint performance may be measured by tracking an exponential moving average the latency of initiating the call (i.e., buffer wait time).

Some embodiments further provide a catch-up routing pipeline. The catch-up routing pipeline allows an endpoint to catch-up to the message checkpoint position of its new higher-performance pipeline before joining the higher-performance pipeline. The catch-up pipeline also enables the system to confirm the improved performance of the endpoint before assigning the endpoint to the higher-performance pipeline. Operation of the catch-up routing pipeline will be described below.

According to some embodiments, routing service customers may be offered endpoint prioritization (i.e., fixed assignment to a default routing pipeline) and/or endpoint grouping (i.e., fixed assignment of one or more endpoints to a particular pipeline), perhaps for appropriate additional fees. A customer may be provided with the ability to manually upgrade to downgrade endpoints to particular routing pipelines based on contextual information such as an endpoint maintenance window and known downstream problems.

Figure 1:
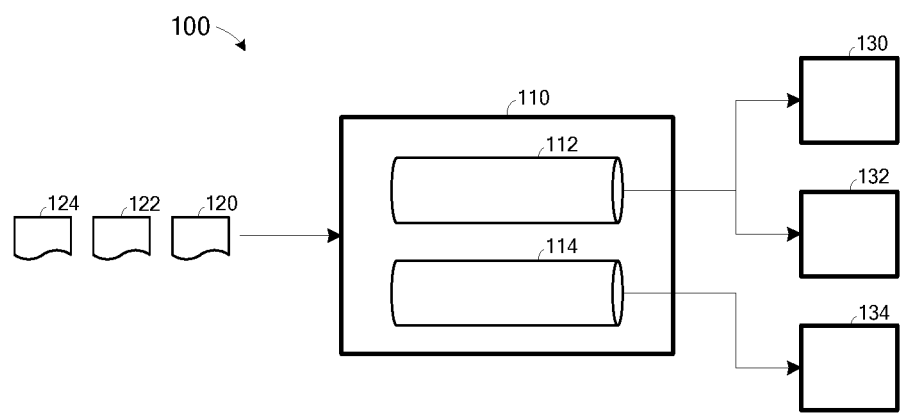
FIG. 1 is a diagram of a message routing architecture including multiple routing pipelines according to some embodiments.

FIG. 1 is a block diagram of system 100 to describe an example of a generic embodiment. System 100 includes routing component 110, incoming messages 120, 122 and 124, and endpoints 130, 132 and 134. Generally, routing component 110 receives messages 120, 122 and 124 and routes each message to an appropriate one of endpoints 130, 132 and 134.

Messages 120, 122 and 124 may comprise any type of messages conforming to any type of protocol and containing any type of payload that is or becomes known. Messages 120, 122 and 124 may also be received from any one or more message sources that are or become known. Similarly, endpoints 130, 132 and 134 may comprise any type of computing message endpoints that are or become known.

Routing component 110 includes routing pipelines 112 and 114, although embodiments are not limited to two routing pipelines. Each of routing pipelines 112 and 114 is assigned to deliver messages to one or more of endpoints 130, 132 and 134. The assignment is based on the relative performance of each endpoint. As shown, routing pipeline 112 delivers messages to endpoints 130 and 132, whose performance is determined to be above a threshold, and pipeline 114 delivers messages to endpoint 134, whose performance is determined to be below the threshold.

In operation, each of routing pipelines 112 and 114 receives each of messages 120, 122 and 124, reads and pre-processes each of messages 120, 122 and 124, and delivers appropriate ones of messages 120, 122 and 124 to its assigned endpoint(s). For example, it will be assumed that message 120 is to be delivered to all endpoints, message 122 is to be delivered to endpoint 130, and message 124 is to be delivered to all endpoint 134. Accordingly, routing pipeline 112 delivers message 120 to endpoints 130 and 132 and delivers message 122 to endpoint 130, and routing pipeline 114 delivers message 120 and message 124 to endpoint 134.

Routing component 110, endpoints 130, 132 and 134, and each other component described herein may be implemented by one or more computing devices (e.g., computer servers), storage devices (e.g., hard or solid-state disk drives), and other hardware as is known in the art. The components may be located remote from one another and may be elements of one or more cloud computing platforms, including but not limited to a Software-as-a-Service, a Platform-as-a-Service, and an Infrastructure-as-a-Service platform. According to some embodiments, each routing pipeline 112 and 114 is implemented by a dedicated virtual machine.

Figure 2:
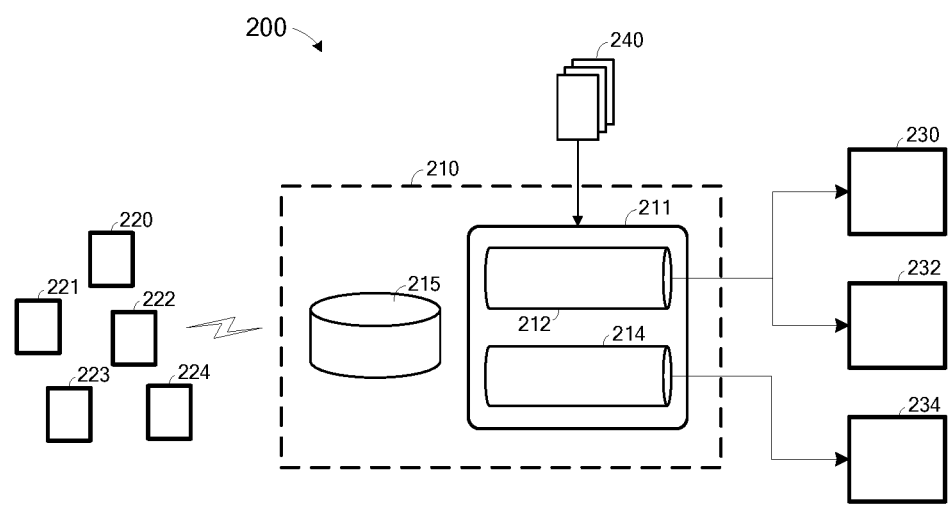
FIG. 2 is a diagram of an Internet of Things (IoT) message routing architecture including multiple routing pipelines according to some embodiments.

FIG. 2 is a block diagram of a more detailed example according to some embodiments. System 200 includes hub 210, IoT devices 220-224, and endpoints 230, 232 and 234. Hub 210 receives messages from IoT devices 220-224 and routes appropriate ones of messages to one or more of endpoints 230, 232 and 234. Implementations may include a large number (e.g., hundreds, thousands or more) of IoT devices. Endpoints 230, 232 and 234 may comprise an external event hub, external storage, a distributed database, etc.

Hub 210 includes gateway 215 to receive messages from IoT devices 220-224 and routing service 211 to route the received messages. Routing service 211 uses routing policy to determine the endpoint(s) to which a particular message should be delivered. According to routing policy 240, the determination may be based on message source, message type, message content and/or any other factors that are or become known. Some messages received from IoT devices 220-224 may be consumed at an event hub of hub 210 and not delivered to external endpoints.

Each of routing pipelines 212 and 214 applies routing policy 240 to each message received at gateway 215 and, if routing policy 240 indicates that a received message should be delivered to one or more endpoints assigned to the pipeline, the pipeline delivers the message to the one or more endpoints. Routing pipelines 212 and 214 may therefore ignore routing policies which are not relevant to any of their assigned endpoints.

According to the FIG. 2 example, endpoint 234 has been identified as being slow to process incoming messages. In some embodiments, endpoint 234 is not currently processing messages slowly but is predicted to be slow in the near future. Techniques for measuring and predicting endpoint performance will be described below. Endpoint 234 is therefore assigned to "slow" routing pipeline 214, while better-performing endpoints 230 and 234 are assigned to "default" routing pipeline 212. Accordingly, routing pipeline 212 delivers messages to endpoints 230 and 232, and pipeline 214 delivers messages to endpoint 234. Consequently, the slow performance of endpoint 234 does not negatively affect the delivery of messages to endpoints 230 and 232.

Figure 3:
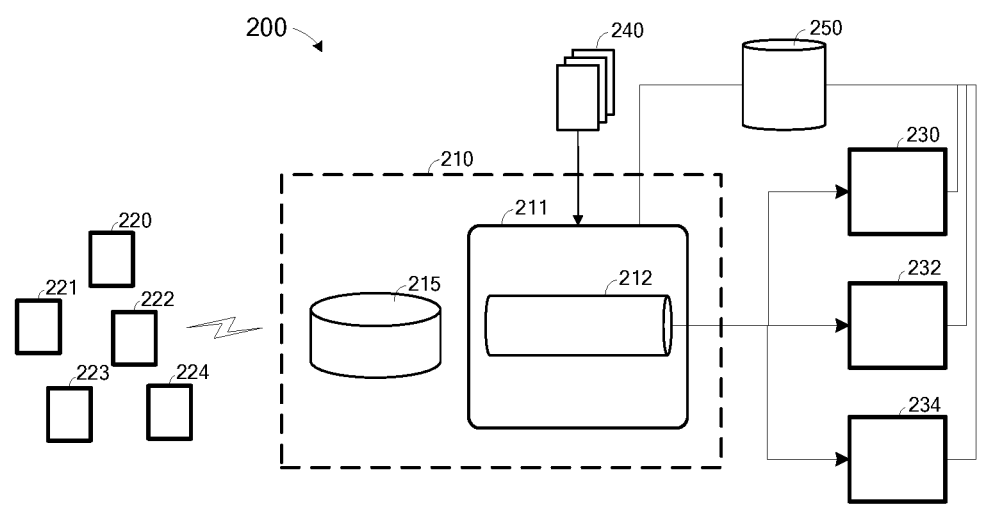
FIG. 3 is a diagram of an IoT message routing architecture according to some embodiments.

Generation of additional performance-related routing pipelines according to some embodiments will now be described. System 200 is again illustrated in FIG. 3, prior to the instantiation of pipeline 214. FIG. 3 also illustrates checkpoint store 250, in communication with routing service 211 and each of endpoints 230, 232 and 234.

According to some embodiments, each routing pipeline maintains a checkpoint of its last successfully-delivered message. In case of a power failure, the routing pipeline only has to resend those messages which were processed after the checkpoint. A routing pipeline moves its checkpoint forward only after a message has been processed by each endpoint for which it is intended.

Each endpoint also keeps a checkpoint of the last message it successfully processed. In this regard, each endpoint may include a message buffer to store received but not-yet-processed messages.

Figure 4:
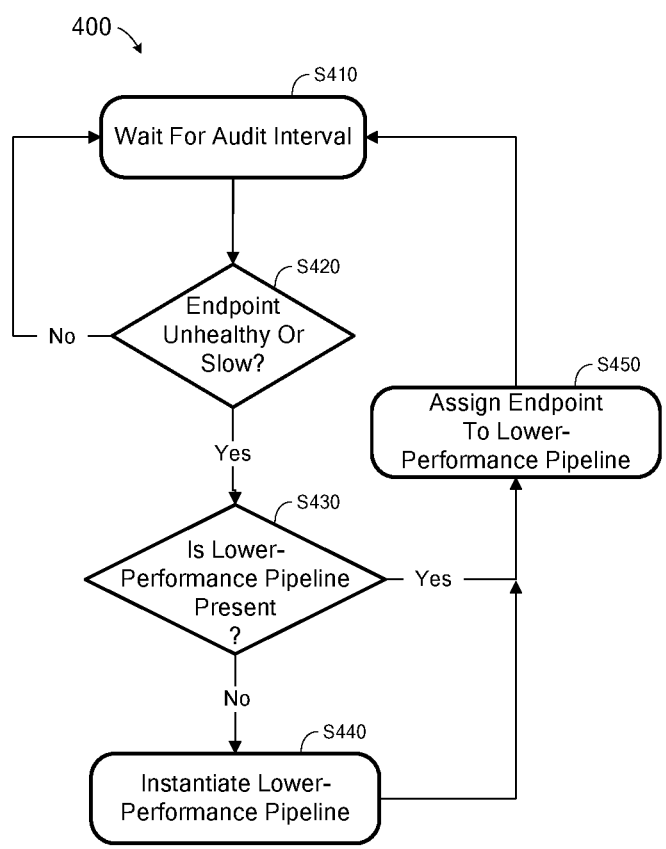
FIG. 4 is a flow diagram of a process to adaptively employ multiple routing pipelines based on endpoint performance according to some embodiments.

FIG. 4 is a flow diagram of process 400 to re-assign endpoints to routing pipelines based on endpoint performance according to some embodiments. Process 400 and the other processes described herein may be performed using any suitable combination of hardware or software. Executable code embodying these processes may be executed by a central processing unit of a microprocessor or microcontroller, for example, and may be stored in any non-transitory tangible medium, including a read-only memory, a volatile or non-volatile random access memory, a fixed disk, a DVD, a Flash drive, or a magnetic tape. Embodiments are not limited to the examples described below.

It will be assumed that system 200 is operating prior to S410 to receive messages from IoT devices 220-224 and deliver them to appropriate ones of endpoints 230, 232 and 234. As described above, such delivery results in updating of checkpoints respectively associated with routing pipeline 212, endpoint 230, endpoint 232 and endpoint 234.

Process 400 pauses at S410 for a preconfigured interval before continuing to S420. As will be appreciated from the foregoing description, the interval is specified to prevent continuous evaluation and re-assigning of endpoints among routing pipelines. According to some embodiments, process 400 starts with an initial delay to capture a first x minutes of endpoint performance information and then repeats every 30 seconds.

At S420, each existing endpoint is evaluated to determine whether the endpoint is unhealthy or slow. Endpoint performance may be determined based on many different metrics such as write/publish latency, failure rate, etc. As described above, each endpoint may be associated with a small in-memory buffer to absorb endpoint performance fluctuations. Some embodiments may monitor, for each endpoint, a duration during which the buffer is full. This duration (i.e., "buffer wait time") corresponds to a duration over which a routing pipeline assigned to the endpoint is blocked because no more messages can be enqueued in the endpoint's buffer.

The determination at S420 may be performed using a prediction model which is based on the buffer wait time. For example, an exponential moving average may be determined for each endpoint at S420. One example model is $EMA_{next} = \alpha \cdot EMA_t + (1-\alpha) \cdot EMA_{t-1}$. Such a model may be useful because only one buffer wait time value needs to be stored for each endpoint, as opposed to many past values which would be required to calculate a true moving average. A prediction model according to some embodiments may comprise a Markov decision process, or a machine learning neural network which is trained based on historical endpoint performance data and inputs which may include, but are not limited to, time, customer configuration, region of customer, and endpoint type.

The determination at S420 may consist of determining whether the performance metric (e.g., the predicted buffer wait time) reflects significantly worse performance than other endpoints assigned to the same routing pipeline. For example, in the case of FIG. 3, it is determined whether the performance of any one of endpoints 230, 232 and 234 is significantly worse than the performance of the other two endpoints. In this regard, endpoint slowness is measured relative to the slowness of all other endpoints sharing a same routing pipeline.

According to some embodiments, an endpoint is considered slow if its performance is more than 10× worse than the best-performing endpoint of its same routing pipeline. In some cases, pipeline assignment may be based on a linear scale (e.g., endpoints exhibiting 1 to n times worse latency of best-performing endpoint assigned to a default pipeline, n to 2n assigned to a slow pipeline, all others assigned to a stuck pipeline). In other cases, pipeline assignment may be based on an exponential scale (e.g., endpoints exhibiting 1 to n times worse latency of best-performing endpoint assigned to a default pipeline, n to $n^2$ assigned to a slow pipeline, all others assigned to a stuck pipeline). Flow returns to S410 to wait if none of endpoints 230, 232 and 234 are determined to be slow at S420.

According to some embodiments, each endpoint is also associated with an UnhealthySince timestamp (e.g., stored in checkpoint store 250). The timestamp is updated each time a message is successfully received. Accordingly, if an endpoint has been unable to accept messages for a long time, a large difference will exist between its Unhealthy Since timestamp and the current time. In such embodiments, S420 may also include a determination of whether an endpoint is unhealthy based on its UnhealthySince timestamp.

It will now be assumed that endpoint 234 is determined to be slow at S420. Flow therefore proceeds to S430 to determine whether routing service 211 includes a routing pipeline associated with lower-performance endpoints. With respect to the FIG. 3 example, the determination at S430 is negative and flow therefore proceeds to S440.

Figure 5:
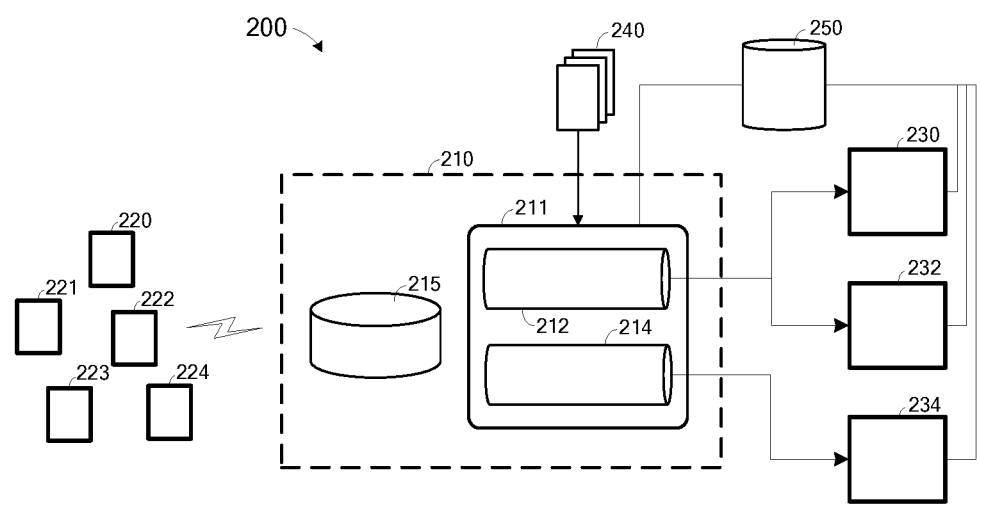
FIG. 5 is a diagram of the FIG. 3 IoT message routing architecture after instantiation of a slow performance routing pipeline according to some embodiments.

A new routing pipeline is instantiated at S440. The new routing pipeline is intended to deliver incoming messages to a lower-performing group of one or more endpoints. According to some embodiments, S440 includes halting and restarting routing service 211 with a new configuration including an additional pipeline such as pipeline 214 of FIG. 5. As shown, new routing pipeline 214 is assigned to endpoint 234 at S450 and routing pipeline 212 remains assigned to endpoints 230 and 232. The checkpoint values of pipeline 212 and endpoints 230 and 232 remain as they were prior to the restart. New pipeline 214 is assigned the checkpoint of the routing pipeline (i.e., routing pipeline 212) from which endpoint 234 was re-assigned.

Flow returns to S410 to again pause for a preconfigure audit interval and continue as described above. S420 is performed for each endpoint of each routing pipeline and as described above, the performance of an endpoint is evaluated only against the performance of other endpoints in its pipeline. Accordingly, if two endpoints are assigned to routing pipeline 214 and the performance of one of the endpoints is significantly worse than the other, a third pipeline may be instantiated at S440 and the worse-performing endpoint may be assigned thereto at S450. Additional pipelines may be added for increasingly poor-performing endpoints. In another example, if it is determined that the performance of endpoint 230 is significantly worse that the performance of endpoint 232, endpoint 230 may be re-assigned to pipeline 214 at S450.

Figure 6:
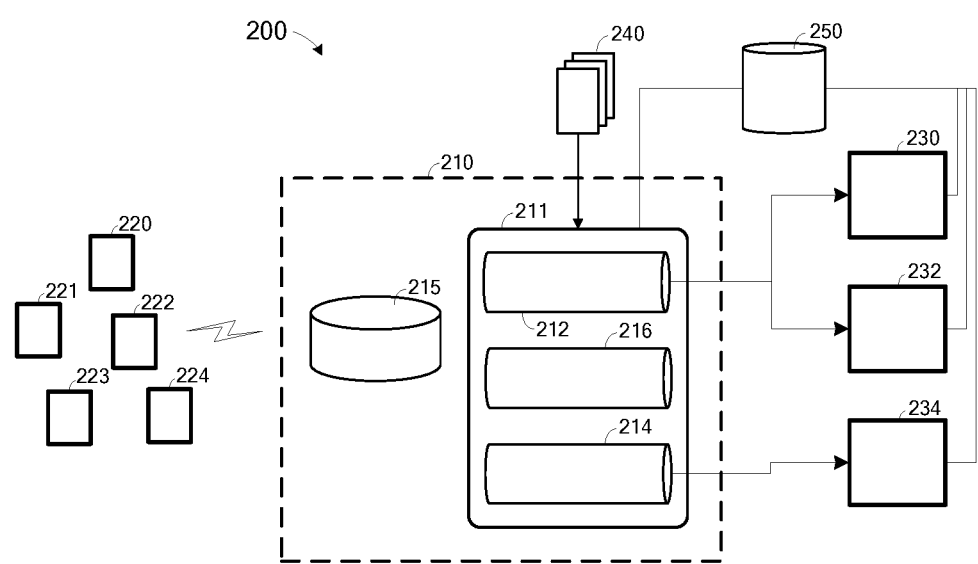
FIG. 6 is a diagram of the FIG. 3 IoT message routing architecture after instantiation of a slow performance routing pipeline and a catch-up routing pipeline according to some embodiments.

According to some embodiments, instantiation of a second routing pipeline at S440 includes instantiation of a third "catch-up" pipeline such as pipeline 216 of FIG. 6. In operation, an endpoint is re-assigned to catch-up pipeline 216 if a sufficient improvement in its performance is detected. Only one endpoint is assigned to the catch-up pipeline at any given time. Catch-up pipeline 216 is used to confirm that an endpoint has actually recovered so it isn't quickly re-assigned back to a lower-performance pipeline after being assigned to the default pipeline. Catch-up pipeline 216 also allows the recovered endpoint to catch up with the message queue before being re-assigned to the default pipeline.

Figure 7:
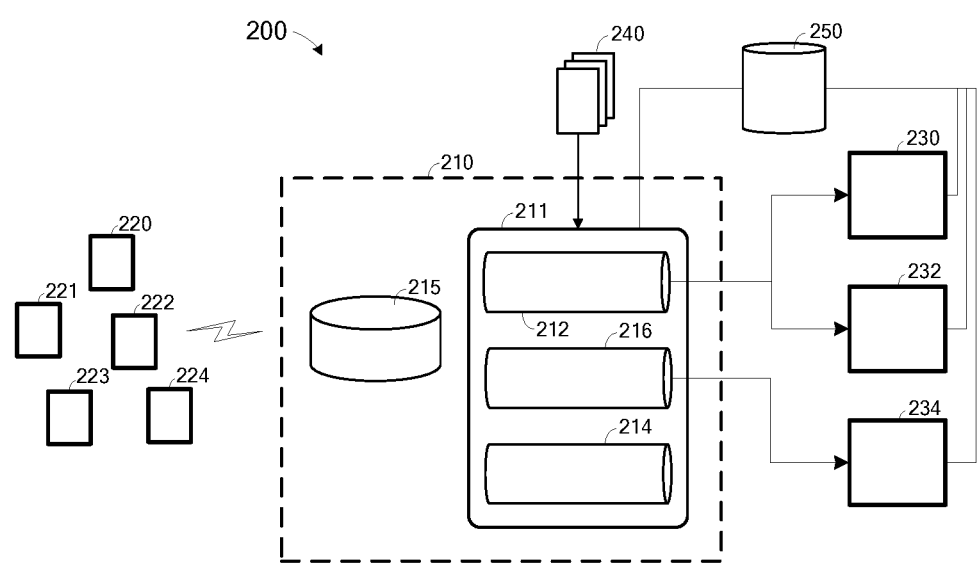
FIG. 7 is a diagram of the FIG. 6 IoT message routing architecture after assigning an endpoint from a slow performance routing pipeline to a catch-up routing pipeline according to some embodiments.

In some embodiments, the periodic determination at S420 may include evaluation of whether the performance of the endpoint associated with the catch-up routing pipeline has improved to a sufficient degree. The determination may be based on any of the above-mentioned performance measures. Moreover, the performance of the endpoint may be compared to the performance of the endpoints of the default routing pipeline to determine whether the performance has improved to a sufficient degree (e.g., better than 10× worse than the best-performing endpoint of the default routing pipeline). FIG. 7 illustrates re-assignment of endpoint 234 from "slow" routing pipeline 214 to catch-up pipeline 216 after a determination that the performance of endpoint 234 has sufficiently improved. Re-assignment includes updating the checkpoint of routing pipeline 214 to equal the current checkpoint of endpoint 234.

Figure 8:
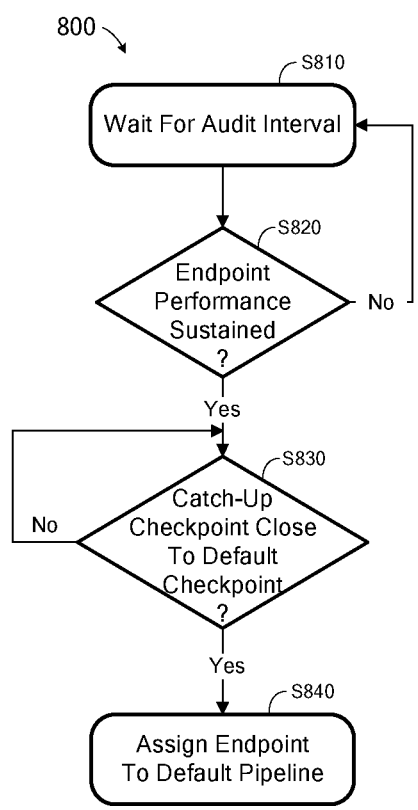
FIG. 8 is a flow diagram of a process to adaptively assign an endpoint from a catch-up routing pipeline to a default routing pipeline according to some embodiments.

FIG. 8 is a flow diagram of a process to re-assign an endpoint from a catch-up routing pipeline to a default routing pipeline according to some embodiments. Process 800 may be performed with respect to a catch-up routing pipeline and not for any of the other pipelines of routing service 211. After waiting for an audit interval at S810 (which may be equal to or different from the other audit intervals discussed herein), it is determined at S820 whether the improved performance of the endpoint of the catch-up pipeline has been sustained for a suitable amount of time. This amount of time may be preconfigured and may be selectable by the customer. If not, flow returns to S810.

If the determination at S820 is positive, it is determined whether the checkpoint of the catch-up pipeline is close to the checkpoint of the default pipeline. Any suitable measure of "closeness" may be used, for example, 100 messages. Flow pauses at S830 until the determination is positive, at which point the endpoint is re-assigned from the catch-up pipeline to the default pipeline.

Figure 9:
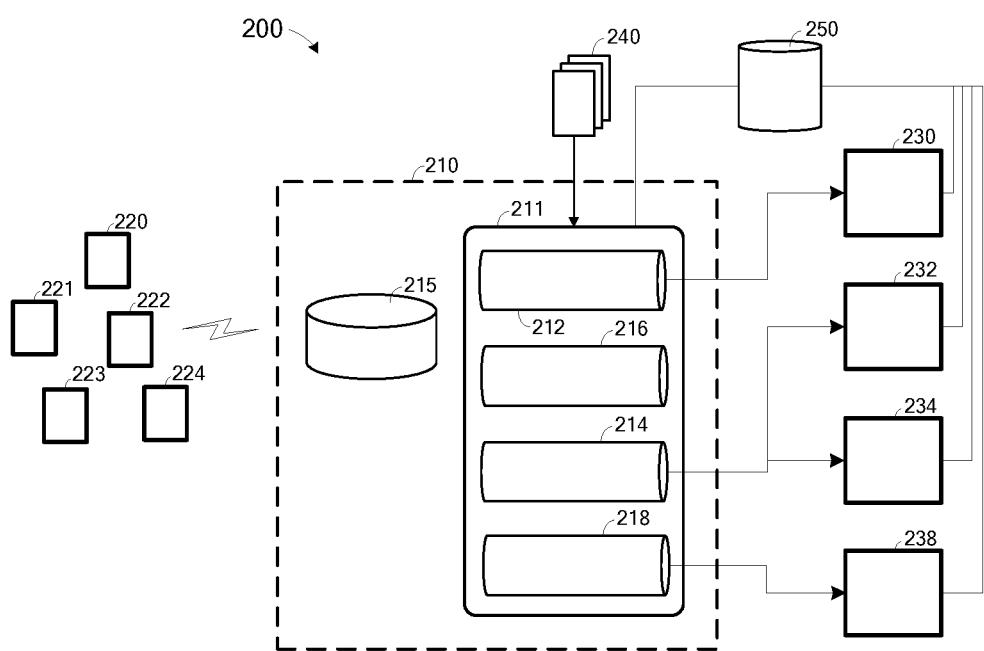
FIG. 9 is a diagram of an IoT message routing architecture including a default routing pipeline, a slow performance routing pipeline, a stuck performance routing pipeline and a catch-up routing pipeline according to some embodiments.

Many variations of the features described herein are possible. For example, any number of pipelines may be employed in addition to a default pipeline and, in some embodiments, a catch-up pipeline, with each pipeline associated with a respective performance grouping. FIG. 9 illustrates system 200 including four routing pipelines. The example shows default pipeline 212, slow pipeline 214, catch-up pipeline 216 and "stuck" pipeline 218. Stuck pipeline 218 is assigned to endpoint 238.

In some embodiments, stuck pipeline 218 is assigned to endpoints which have been unhealthy (e.g., as indicated by their UnhealthySince parameter) for at least a given amount of time (e.g., one hour). An endpoint may move from stuck pipeline 218 to catch-up pipeline 216 if a performance improvement is detected, just as an endpoint may be moved from slow pipeline 214 to catch-up pipeline 216. In some embodiments, pipeline 218 is a "slower" pipeline which is assigned to endpoints whose performance is at least 10× worse than the performance of the best-performing endpoint assigned to slow endpoint 214.

Figure 10:
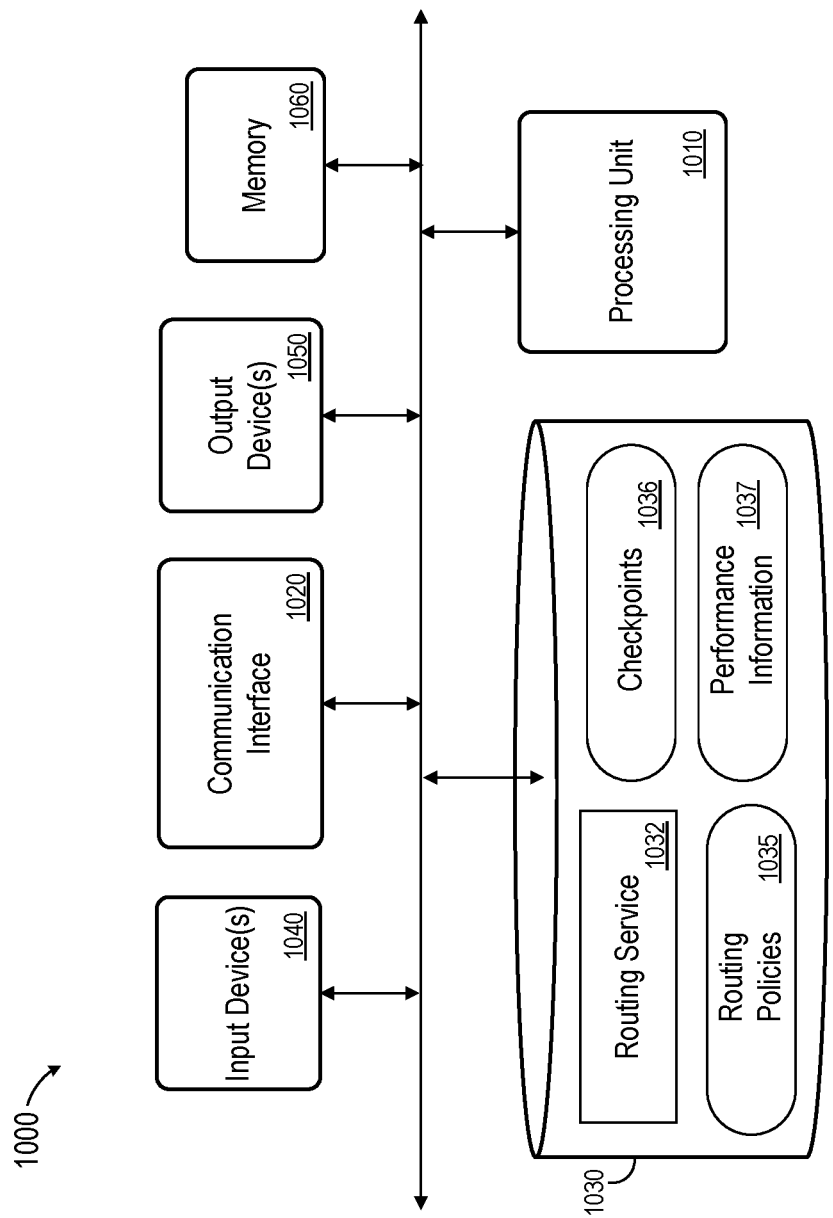
FIG. 10 is a block diagram of a computing system according to some embodiments.

FIG. 10 is a block diagram of system 1000 according to some embodiments. System 1000 may comprise a general-purpose computing server and may execute program code to provide a routing service as described herein. System 1000 may be implemented by a cloud-based virtual server according to some embodiments.

System 1000 includes processing unit 1010 operatively coupled to communication device 1020, persistent data storage system 1030, one or more input devices 1040, one or more output devices 1050 and volatile memory 1060. Processing unit 1010 may comprise one or more processors, processing cores, etc. for executing program code. Communication interface 1020 may facilitate communication with external devices, such as client devices, and data providers as described herein. Input device(s) 1040 may comprise, for example, a keyboard, a keypad, a mouse or other pointing device, a microphone, a touch screen, and/or an eye-tracking device. Output device(s) 1050 may comprise, for example, a display (e.g., a display screen), a speaker, and/or a printer.

Data storage system 1030 may comprise any number of appropriate persistent storage devices, including combinations of magnetic storage devices (e.g., magnetic tape, hard disk drives and flash memory), optical storage devices, Read Only Memory (ROM) devices, etc. Memory 1060 may comprise Random Access Memory (RAM), Storage Class Memory (SCM) or any other fast-access memory.

Routing service 1032 may comprise program code executed by processing unit 1010 to cause system 1000 to instantiate and manage routing pipelines which receive, pre-process, and deliver messages as described herein. Routing policies 1035 may determine how and where messages are routed, checkpoints 1036 may include current checkpoints of routing pipelines and endpoints, and performance information 1037 may include data indicating the current and/or predicted performance of the endpoints as described herein. Data storage device 1030 may also store data and other program code for providing additional functionality and/or which are necessary for operation of system 1000, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions.

Embodiments described herein are solely for the purpose of illustration. Those in the art will recognize other embodiments may be practiced with modifications and alterations to that described above.

What is claimed is:

1. A computer-implemented system comprising:
a routing service comprising:
a first routing pipeline to receive messages and to route a first plurality of the messages to a first plurality of endpoints;
a second routing pipeline to receive the messages and to route a second plurality of the messages to a second plurality of endpoints; and
a third routing pipeline,
the routing service to:
determine an improved performance of one of the second plurality of endpoints; and
based on the determination of the improved performance, assign the one of the second plurality of endpoints to the third routing pipeline,
wherein the third routing pipeline is to receive the messages and to route a third plurality of the messages to the one of the second plurality of endpoints.

2. A system according to claim 1, the routing service further to:
determine that a duration of the improved performance of the one of the second plurality of endpoints is greater than a threshold duration;
determine that a difference between a message checkpoint of the third routing pipeline and a message checkpoint of the first routing pipeline is less than a threshold value; and
in response to the determination that the duration is greater than the threshold duration and the determination that the difference is less than a threshold value, re-assign the one of the second plurality of endpoints to the first routing pipeline.

3. A system according to claim 1, the routing service to:
determine a performance of each of the first plurality of endpoints and the second plurality of endpoints and to assign the second plurality of endpoints to the second routing pipeline based on the determined performances.

4. A system according to claim 3, wherein the determination is based on a respective time to initiate an asynchronous write request associated with each of the first plurality of endpoints and the second plurality of endpoints.

5. A system according to claim 1, the routing service to:
predict a performance of each of the first plurality of endpoints and the second plurality of endpoints and to assign the second plurality of endpoints to the second routing pipeline based on the predicted performances.

6. A system according to claim 5, wherein the prediction is based on a respective time to initiate an asynchronous write request associated with each of the first plurality of endpoints and the second plurality of endpoints.

7. A system according to claim 5, the routing service comprising a trained machine-learning network to predict the performance.

8. A method comprising:
determining a respective performance level associated with each of a plurality of endpoints assigned to a first routing pipeline;
determining one of the plurality of endpoints based on the respective performance levels;
in response to the determination of the one of the plurality of endpoints, instantiating a second routing pipeline and assign the one of the plurality of endpoints to the second routing pipeline,
    wherein the first routing pipeline is to receive messages and to route a first plurality of the messages to the plurality of endpoints other than the of the plurality of endpoints, and
    wherein the second routing pipeline is to receive the messages and to route a second plurality of the messages to the one of the plurality of endpoints;
determining an improved performance of the one of the second plurality of endpoints; and
based on the determination of the improved performance, assign the one of the second plurality of endpoints to a third routing pipeline,
    wherein the third routing pipeline is to receive the messages and to route a third plurality of the messages to the one of the second plurality of endpoints.

9. A method according to claim 8, further comprising:
determining that a duration of the improved performance of the one of the plurality of endpoints is greater than a threshold duration;
determining that a difference between a message checkpoint of the third routing pipeline and a message checkpoint of the first routing pipeline is less than a threshold value; and
in response to the determination that the duration is greater than the threshold duration and the determination that the difference is less than a threshold value, re-assigning the one of the plurality of endpoints to the first routing pipeline.

10. A method according to claim 8, wherein the determination of the respective performance levels is based on a respective time to initiate an asynchronous write request associated with each of the plurality of endpoints.

11. A method according to claim 8, wherein the determination of the respective performance levels comprises a prediction of the performance levels.

12. A method according to claim 11, wherein the prediction is based on a respective time to initiate an asynchronous write request associated with each of the plurality of endpoints.

13. A computer-readable medium storing program code executable by a computing system to cause the computing system to:
    determine a respective performance level associated with each of a plurality of endpoints assigned to a first routing pipeline;
    determine one of the plurality of endpoints based on the respective performance levels;
    in response to the determination of the one of the plurality of endpoints, instantiate a second routing pipeline and assign the one of the plurality of endpoints to the second routing pipeline,
        wherein the first routing pipeline is to receive messages and to route a first plurality of the messages to the plurality of endpoints other than the one of the plurality of endpoints, and
        wherein the second routing pipeline is to receive the messages and to route a second plurality of the messages to the one of the plurality of endpoints;
    determine an improved performance of the one of the second plurality of endpoints; and
    based on the determination of the improved performance, assign the one of the second plurality of endpoints to a third routing pipeline,
        wherein the third routing pipeline is to receive the messages and to route a third plurality of the messages to the one of the second plurality of endpoints.

14. A medium according to claim 13, the program code executable by a computing system to cause the computing system to:
    determine that a duration of the improved performance of the one of the plurality of endpoints is greater than a threshold duration;
    determine that a difference between a message checkpoint of the third routing pipeline and a message checkpoint of the first routing pipeline is less than a threshold value; and
    in response to the determination that the duration is greater than the threshold duration and the determination that the difference is less than a threshold value, re-assign the one of the plurality of endpoints to the first routing pipeline.

15. A medium according to claim 13, wherein the determination of the respective performance levels is based on a respective time to initiate an asynchronous write request associated with each of the plurality of endpoints.

16. A medium according to claim 13, wherein the determination of the respective performance levels comprises a prediction of the performance levels.

17. A medium according to claim 16, wherein the prediction is based on a respective time to initiate an asynchronous write request associated with each of the plurality of endpoints.

* * * * *